United States Patent
Yamamoto et al.

(10) Patent No.: US 7,930,875 B2
(45) Date of Patent: *Apr. 26, 2011

(54) JET-TYPE STEAM ENGINE

(75) Inventors: Yasushi Yamamoto, Kanagawa (JP); Makoto Abe, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 548 days.

This patent is subject to a terminal disclaimer.

(21) Appl. No.: 11/920,872

(22) PCT Filed: May 19, 2006

(86) PCT No.: PCT/JP2006/310512
§ 371 (c)(1),
(2), (4) Date: Nov. 21, 2007

(87) PCT Pub. No.: WO2006/126661
PCT Pub. Date: Nov. 30, 2006

(65) Prior Publication Data
US 2009/0107145 A1 Apr. 30, 2009

(30) Foreign Application Priority Data
May 25, 2005 (JP) ................................. 2005-152542

(51) Int. Cl.
*B63H 11/12* (2006.01)
*B63H 11/00* (2006.01)
*F02K 9/50* (2006.01)
(52) U.S. Cl. ................. 60/227; 60/221; 60/670; 415/80
(58) Field of Classification Search ................... 60/645, 60/670, 685, 641.8, 221, 227; 415/25, 63, 415/80–82
See application file for complete search history.

(56) References Cited

U.S. PATENT DOCUMENTS

| 2,341,638 | A | * | 2/1944 | Martinka | 60/659 |
| 2,793,502 | A | * | 5/1957 | Riehl | 60/648 |
| 4,249,083 | A | | 2/1981 | Bitterly | |

(Continued)

FOREIGN PATENT DOCUMENTS

DE 24 12 908 A1 10/1975

(Continued)

OTHER PUBLICATIONS

European Search Report dated Dec. 29, 2008.

*Primary Examiner* — Hoang M Nguyen
(74) *Attorney, Agent, or Firm* — McGinn IP Law Group PLLC

(57) ABSTRACT

In an engine, a rotor having a folded jet pipe is rotatably supported in a sealed container filled with a liquid. A heating portion is inserted in a center cylinder at the center of the rotor, and a fluid of a high temperature is passed therethrough to vaporize the liquid sucked through the suction pipe of the rotor. A mixture of steam and liquid is jetted from the jet pipe due to the pressure of the steam that is vaporized to rotate the rotor. A check valve for jetting and a check valve for suction are disposed at the ends of the jet pipe and the suction pipe. The jetted steam is guided to a condenser disposed on the sealed container, and is condensed and is refluxed into the sealed container. A vacuum pump is connected to the condenser, and the pressure in the sealed container is held at the saturated steam pressure.

11 Claims, 3 Drawing Sheets

U.S. PATENT DOCUMENTS 5,234,320 A * 8/1993 Domenge ................ 417/40
6,565,310 B1    5/2003 Davidow

FOREIGN PATENT DOCUMENTS

| DE | 35 05 201 A1 | 8/1986 |
| DE | 39 35 048 A1 | 9/1990 |
| JP | 59-90710 | 5/1984 |
| JP | 59-142404 | 9/1984 |
| JP | 59-142405 | 9/1984 |
| JP | 59-168205 | 9/1984 |
| JP | 2001-20706 | 1/2001 |
| JP | 2002-221043 | 8/2002 |
| JP | 2002-223499 | 8/2002 |

* cited by examiner

JET-TYPE STEAM ENGINE

FIELD OF THE INVENTION

This invention relates to a steam engine for converting the thermal energy into the mechanical energy such as rotational energy and, more particularly, to a steam engine for efficiently generating the mechanical energy from a heat source of relatively low temperatures.

BACKGROUND ART

In recent years, technologies have been developed for utilizing a variety of energy resources from viewpoint of environmental measure, saving resources and saving energy. Among them is a technology for taking out the mechanical energy from the thermal energy present in the natural world, such as solar heat. Technologies have also been developed to improve the thermal efficiency of an internal combustion engine by generating the power by utilizing the heat wasted into the exhaust gas or the cooling water of an internal combustion engine such as diesel engine, and by recovering the power.

A heat engine is used for converting the thermal energy into the mechanical energy such as rotational energy. The heat engine such as the internal combustion engine or the steam turbine that uses an ordinary fuel such as petroleum, natural gas or the like, is the one in which the fuel is burned to produce an operation fluid of a high temperature and a high pressure and the thermal energy is converted into the mechanical energy, and features a high thermal efficiency since the mechanical energy is taken out from the heat source in the state of a high temperature. However, the temperature of the thermal energy in the natural world and the exhaust heat of the internal combustion engine are, usually, not so high, i.e., these are the thermal energy in a low-temperature state. In order to efficiently take out the mechanical energy from such heat sources, therefore, it becomes necessary to use a heat engine adapted to the thermal source in a low-temperature state.

The engine disclosed in JP-A-2001-20706 is a heat engine for generating the mechanical energy from the heat source in a low-temperature state. As shown in FIG. 3, this engine comprises a heating portion 101 and a cooling portion 102 which are coupled together through nozzles 103. A turbine 106 is arranged in the cooling portion 102 at a position facing the nozzles 103, and rotates together with magnets 107. On the inside of the magnets 107, a stationary generating coil 110 is arranged facing thereto, and the magnets 107 and the generating coil 110 together constitute a generating device. The heating portion 101 and the cooling portion 102 are sealed, respectively. Water 104 which is an operation fluid is filled therein, and the air inside is evacuated by a vacuum pump. Many heat pipes 105 are mounted on the upper side of the cooling portion 102 to radiate the heat.

The heating portion 101 and the cooling portion 102 as a whole constitute a heat pipe, and water 104 became the steam being heated in the heating portion 101 from the lower side thereof creates a high-speed stream which is jetted to the blades of the turbine 106 from the nozzles 103. Therefore, the turbine 106 and the magnets 107 rotate to produce the rotational energy which is, finally, converted into the electric energy by the magnets 107 and the generating coil 110, and is output to an external unit. The steam after having driven the turbine 106 is cooled down with the heat-radiating action of the heat pipes 105 and returns back to water. The condensate falls down to the lower side of the cooling portion 102 due to the gravity, and is refluxed into the heating portion 101 through the central portion.

The heat pipe that utilizes the vaporization and condensation of liquid contained in the sealed container is, usually, used as a heat carrying means, i.e., as a heat transfer device. However, the steam of liquid contained in the heat pipe moves accompanying large velocity energy and, therefore, the power can be taken out therefrom as described above. In this case, the mechanical energy can be taken out from the heat source in a low-temperature state.

The turbine disclosed in the above JP-A-2001-20706 is a so-called velocity type engine which utilizes the velocity energy of the operation fluid. To efficiently operate the turbine, the rotational speed of the turbine must be increased so that the circumferential velocity thereof is increased to match the velocity of the steam. However, when decreasing the diameter of the turbine to miniaturize it, the rotational speed of the turbine becomes very high and a large centrifugal force acts on the turbine, and may break it down. Further, when the temperature of the heating portion is low and the steam is of a low temperature, the superheat of the steam is in a low degree, and water droplets tend to form due to the cooling. Water. droplets that are formed come into collision with the turbine blades at high speeds, and the so-called erosion is developed on the turbine blades due to the collision of water droplets.

When the heat engine is rotated being contained in a closed container, the rotary shaft must be supported by bearings having sealing performance. To support the rotary shaft that rotates at high speeds such as of the turbine, precision bearings are necessary. Namely, complex and expensive bearings must be used to support the rotary shaft maintaining sealing performance.

DISCLOSURE OF THE INVENTION

In order to solve the above problems inherent in the conventional heat engine, the steam engine of the present invention rotatably supports a rotor having jet pipes in a sealed container filled with a liquid, and vaporizes the liquid by a heating portion inserted in the central portion of the rotor so as to be jetted from the jet pipes, causing rotation to the rotor for converting the thermal energy into the rotational energy. That is, as described in claim 1, a steam engine of the present invention comprising
"a sealed container containing a liquid therein, and a condenser on the upper part of the sealed container communicated with the sealed container to condense the steam of the liquid, wherein
  the sealed container contains a rotor that has:
  a heating portion at the central portion thereof;
  a folded jet pipe radially extending from the central portion and having a check valve for jetting at an end thereof; and
  a folded suction pipe radially extending from the central portion and having a check valve for suction at an end thereof;
  the rotor is dipped in the liquid and is rotatably supported in the sealed container, and
  the power of rotation of the rotor is taken out."

The steam engine of the present invention is provided with the rotor having the jet pipe in the sealed container filled with the liquid, wherein the liquid is sucked through the suction pipe to the surrounding of the heating portion at the center of the rotor and is vaporized. Due to the stream of a high pressure that is vaporized, a mixture in a state where the liquid and the steam are mixed together is jetted from the jet pipe, and the rotational force is obtained by the reaction thereof. The mixture that is jetted contains much liquid, and its mass is much greater than that of the steam. Therefore, the rotational force obtained by the reaction, i.e. the rotational torque becomes much higher than that of when the steam only is jetted. Accordingly, a high torque is obtained even when the rotor rotates at low speed, and the steam engine can be efficiently operated even at low speed unlike the turbine which converts the velocity energy of steam into the rotational energy.

Further, the steam engine rotates the rotor comprising the jet pipe and the suction pipe that extends radially from the central portion thereof, and is simple in the constitution since it has neither the nozzles nor the stator blades that are included in the ordinary turbines. The rotational speed is relatively lower than that of the turbine, and precision bearings for high speeds do not have to be employed for supporting the rotary shaft. Besides, no erosion is caused by the collision of water droplets.

A check valve for suction is disposed in the suction pipe of the steam engine of the invention, and a check valve for jetting is disposed in the jet pipe. The liquid sucked through the suction pipe is heated by the heating portion at the center of the rotor and become the steam to elevate its pressure. However, no counter flow is produced from the suction pipe since the check valve for suction is disposed at the end of the suction pipe. When the pressure of the steam is elevated to a sufficient degree, the steam expands through the jet pipe and is jetted in the form of a mixture of liquid and steam into the liquid through the check valve for jetting, and imparts the rotational torque to the rotor. That is, the liquid stays near the heating portion until it becomes the steam of a high pressure, and the heat can be transferred to a sufficient degree even if the heating portion is in a low-temperature state.

As described in claim 2, it is desirable that a vacuum pump is connected to the condenser, and the pressure in the sealed container and in the condenser is set to be a saturated steam pressure of the liquid. The vacuum pump is connected to the condenser to evacuate the gas such as the air from the condenser, and the pressure in the sealed container and in the condenser is set to be the saturated steam pressure of the liquid that is contained therein. In this case, the boiling point of the liquid decreases and the liquid become the steam state even at low temperatures. As a result, the liquid easily becomes the steam even when the temperature of the heating portion is not so high, and the engine is efficiently operated to take out the rotational energy.

As described above, the steam engine of the present invention is capable of efficiently converting the heat possessed by a heat source of a low temperature into the rotational energy, and is suited as an engine for taking out the power from the solar heat. As described in claim 3, the heating portion at the center of the rotor can be so constituted as to be heated by the sunlight.

As described in claim 4, further, it is desirable that the jet pipe and the suction pipe are formed in a streamline shape in cross section thereof. The steam engine of the present invention rotates, in the liquid, the rotor comprising the jet pipe and the suction pipe. Upon forming the jet pipe and the suction pipe in the streamline shape in cross section, therefore, the fluid resistance which the rotor receives from the liquid decreases, the power loss decreases, and the thermal efficiency of the engine can be improved.

BEST MODE FOR CARRYING OUT THE INVENTION

Figure 1:
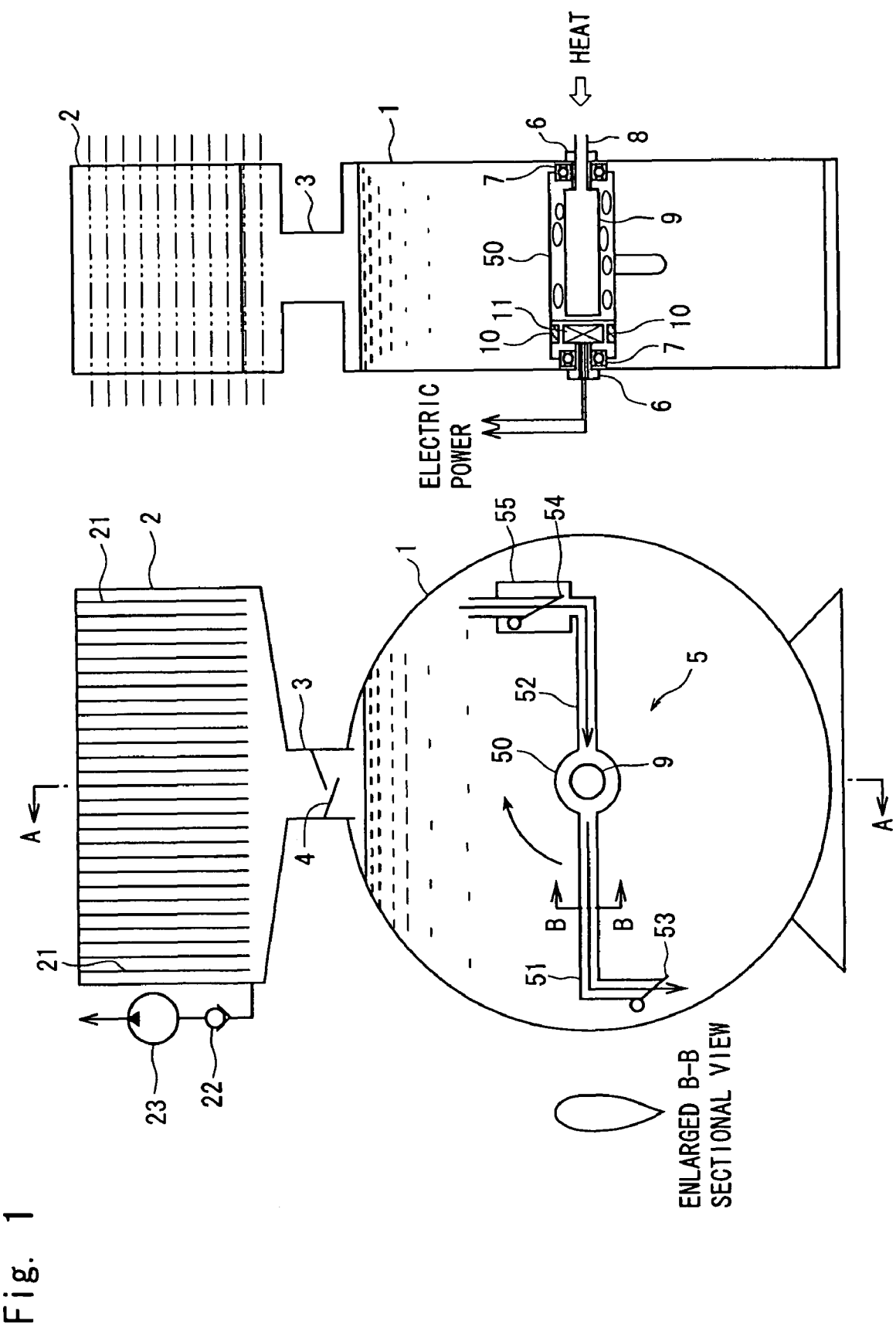
FIG. 1 is a sectional view of a steam engine of the present invention.
Figure 2:
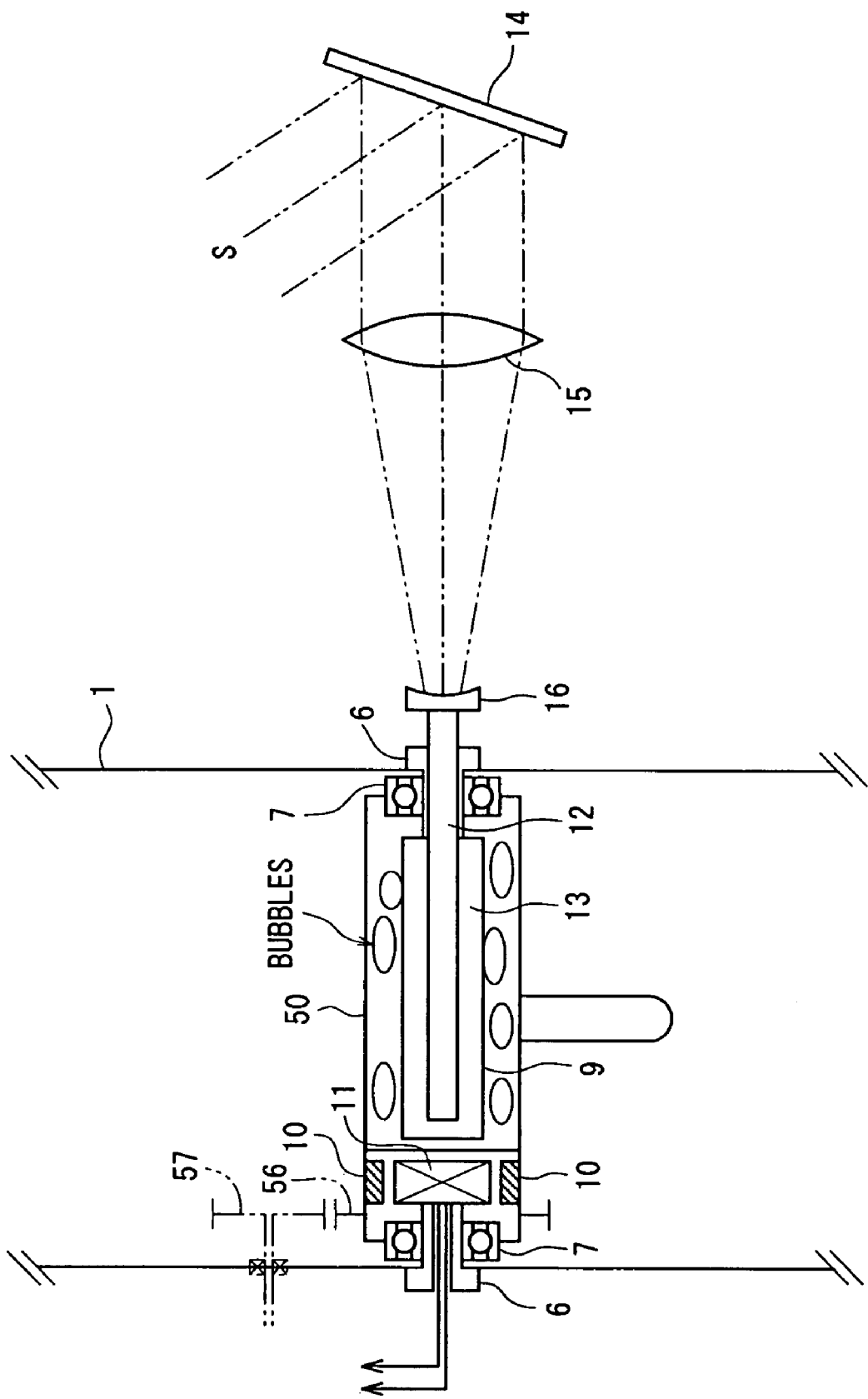
FIG. 2 is a view illustrating a heating portion in the steam engine of the present invention.
Figure 3:
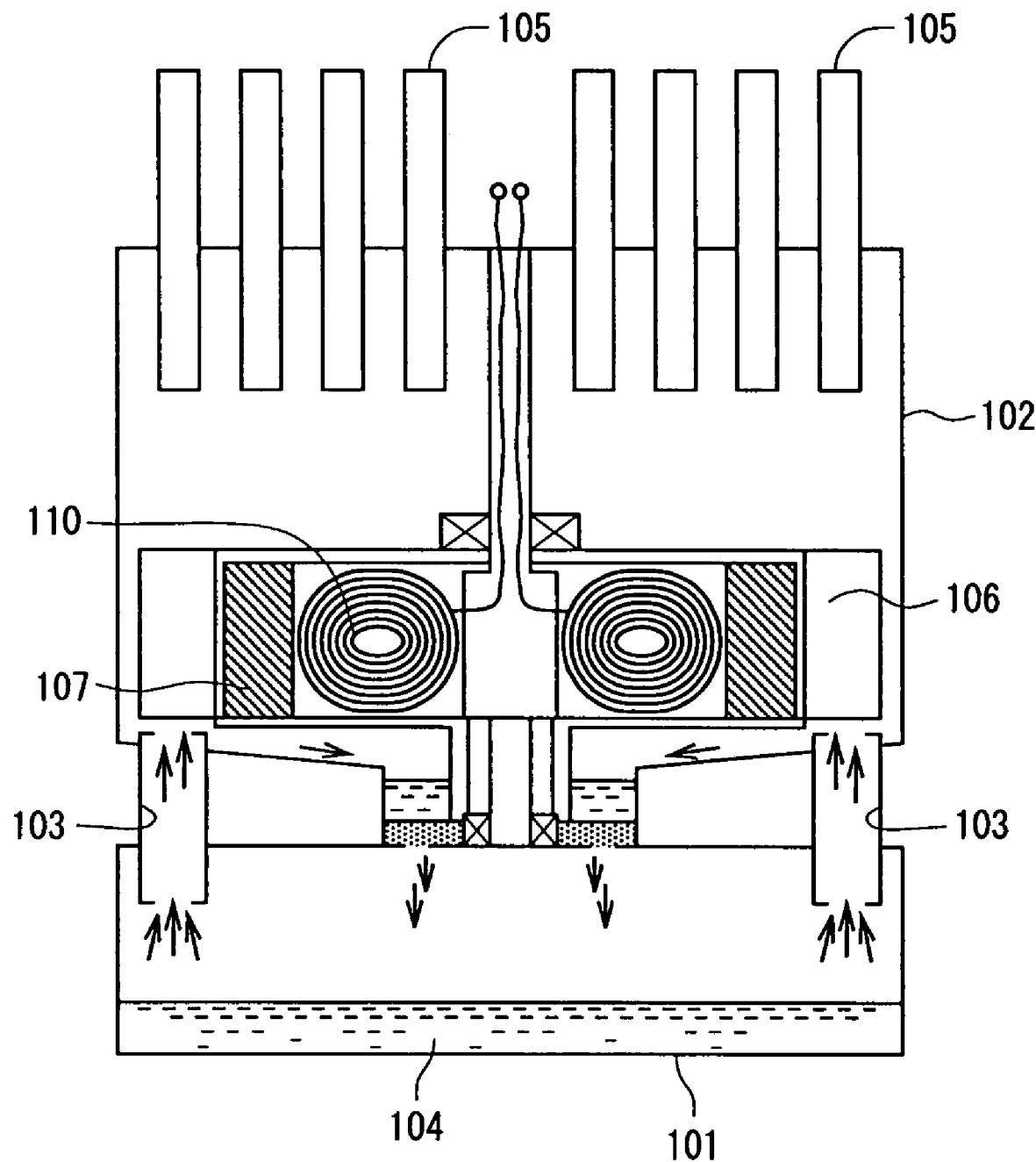
FIG. 3 is a view illustrating an example of a conventional steam engine.

An embodiment of the invention will now be described in detail with reference to the drawings. A sectional view of the steam engine of the present invention is shown in the center of FIG. 1, and a sectional view along A-A is shown on the right side thereof. Further, a sectional view of a jet pipe on an enlarged scale (B-B cross section) is shown on the left side. FIG. 2 is a view illustrating in detail the central portion of the rotor and the heating portion in the steam engine and, particularly, illustrating an embodiment which is so constituted as to be heated by the solar heat.

The steam engine comprises a sealed container 1 of a circular shape in cross section, and contains water therein as a liquid (operation fluid) to be heated which is nearly filling the sealed container 1. A condenser 2 is installed on the upper part of the sealed container 1 to condense the steam into the condensate. The condenser 2 is coupled to the sealed container 1 through a short pipe 3. A plurality of baffle plates 4 are provided in the short pipe 3 maintaining a gap preventing water in the state of liquid from entering into the condenser 2 but permitting the condensate refluxing into the sealed container 1 from the condenser 2.

A rotor 5 is disposed in the circular sealed container 1 being dipped in water. The rotor 5 comprises a center cylinder 50 at the central portion thereof, and a jet pipe 51 and a suction pipe 52 extending in the radial direction are connected to the center cylinder 50. As shown in the diagram in the center of FIG. 1, the jet pipe 51 and the suction pipe 52 are extending in the directions opposite to each other at an angle of 180 degrees, and their ends are folded at right angles. Though the ends are folded at right angles in this embodiment, they may be mildly folded.

A check valve 53 for jetting is attached to the end of the jet pipe to permit the flow in only a direction in which the mixture of steam and water is jetted from the jet pipe 51, and a check valve 54 for suction is attached to the end of the suction pipe to permit the flow of water toward the center cylinder 50 only. To attach the check valve 54 for suction, a suction chamber 55 of a diameter larger than that of the suction pipe is formed at the end of the suction pipe 52. As shown in the view in the left side of FIG. 1, further, the jet pipe 51 and the suction pipe 52 are formed in a streamline shape in cross section. To form the streamline shape in cross section, a closure member of a streamline shape may be fixed to a pipe of a circular shape in cross section.

As shown in the diagram in the right side of FIG. 1 and FIG. 2, the center cylinder 50 of the rotor 5 is rotatably supported by sleeves 6 fixed to the right and left side walls of the sealed container 1 through bearings 7 having sealing function. A heat pipe 8 is inserted in the center hole of the sleeve 6 on the right side in the drawing, and a heat-radiating portion of a large diameter of the heat pipe 8 is extending in the center cylinder 50 in the axial direction. The heat-radiating portion serves as a heating portion 9 of the steam engine, and water sucked in the center cylinder 50 produces steam being heated by, for example, the exhaust heat of the internal combustion engine transferred through the heat pipe 8. In this embodiment, the exhaust heat is transferred to the heating portion 9 by using a heat pipe. However, the temperature of the heating portion 9 can also be elevated by providing a pipe through which the fluid of a high temperature flows.

A partitioning wall for preventing the infiltration of water or the like is provided in front of the heating portion 9 of the center cylinder 50, and magnets 10 are fixed to the circumferential wall of the center cylinder 50 partitioned by the partitioning wall and rotate together with the rotor 5. A generating coil 11 is placed at a position facing the magnets 10. The generating coil 11 is fixed to the sleeve 6 on the left side in the drawing, and electric wires for taking out the generated electric power are laid passing through a center hole thereof. In this embodiment, the rotational energy is output as the electric energy. As indicated by a two-dot chain line in FIG. 2, a gear 56 is fixed to the center cylinder 50 of the rotor 5, a gear 57 that meshes therewith is supported by the side wall of the sealed container 1 so as to rotate, and the power is taken out in the form of rotational energy.

The condenser 2 installed on the upper side of the sealed container 1 has an outer wall made of aluminum or the like having good heat transfer property for improving heat radiating performance, and many plate-like heat transfer fins 21 are provided therein in the vertical direction. Depending upon the cases, the heat radiating fins may be attached to the outer walls as indicated by two-dot chain lines in the view in the right side of FIG. 1. The bottom wall of the condenser 2 is inclined so as to collect the condensate into the short pipe 3. Further, the interior of the condenser 2 is connected to a vacuum pump 23 via a check valve 22 to evacuate gases such as the air and the like and to maintain the pressure in the condenser 2 and the sealed container 1 at the saturated steam pressure.

Next, described below is the operation of the steam engine of the present invention.

Water in the sealed container 1 is fed into the center cylinder 50 of the rotor 5 that is rotatably supported through the check valve 54 for suction and the suction pipe 52. Exhaust heat is transferred to the heating portion 9 inserted in the center cylinder 50, i.e., to the heat-radiating portion of the heat pipe 8 to elevate the temperature thereof. Water that is fed comes in contact with the heating portion 9 and partly turns into the steam. The pressure in the center cylinder 50 increases accompanying generation of the steam. As the pressure exceeds a predetermined value, the check valve 53 for jetting opens, and the steam passes through the folded jet pipe 51 while expanding and is jetted at a high speed from the end thereof in a state of being mixed with water. Due to the inertia of the jetted mixture of steam and water, the pressure decreases in the center cylinder 50, water is sucked again through the suction pipe 52, and the actions of jetting and suction are repeated hereinafter.

The rotational torque acts on the rotor 5 due to the reaction of the jetted mixture, and the rotor 5 rotates clockwise in FIG. 1. The mixture that is jetted contains water which is a liquid in large amounts, water having a specific gravity much larger than that of the steam. Therefore, the momentum of the mixture and the rotational torque that acts on the rotor 5 becomes very large. A required power can, therefore, be taken out even when the rotor 5 is rotating at a low speed. The rotational energy of the rotor 5 is taken out as electric energy to an external unit due to the electromagnetic interaction between the magnets 10 that rotate together with the rotor 5 and the stationary generating coil 11.

The rotor 5 is dipped in water in the sealed container 1 and rotates in water and, therefore, receives fluid resistance of water. To decrease the resistance, the jet pipe 51 and the suction pipe 52 are formed in a streamline shape in cross section, decreasing the power loss caused by the fluid resistance. Further, water rotates, too, in the sealed container 1 accompanying the rotation of the rotor 5. The sealed container 1 has a circular shape in cross section and, therefore, water smoothly rotates decreasing the loss of power caused by the turbulence of water stream.

The steam jetted from the jet pipe 51 rises through water, is sent to the condenser 2 through the short pipe 3, and is cooled by the heat radiating fins 21 so as to be condensed into the condensate. The condensate flows down along the wall surface and is refluxed into the sealed container 1 through the short pipe 3. A vacuum pump 23 is connected to the condenser 2 to evacuate the air and the like, whereby the pressure in the condenser 2 and in the sealed container 1 decreases and is maintained at the saturated steam pressure. Accordingly, the boiling point of water in the sealed container 1 decreases and water vaporizes to generate the steam which produces the rotational torque for rotating the rotor 5 despite the heating portion 9 is in a low-temperature state where the temperature is not so high.

According to the embodiment shown in FIG. 2, the steam engine of the present invention is operated using the solar heat as a heat source. In this embodiment, the basic constitutions of the sealed container 1 and the rotor 5 are the same as those of the steam engine of FIG. 1. What makes a difference is the constitution of the heating portion inserted in the center cylinder 50; i.e., a glass member 12 and a heat transfer member 13 made of aluminum or the like are used instead of the heat pipe so as to accomplish the heating by solar light.

The solar ray S is collected by a mirror 14 and a lens 15, and is guided to a lens 16 placed at an end of the glass member 12. The solar ray is turned by the lens 16 into a parallel ray which passes through the glass member 12 to elevate the temperature of the heat transfer member 13. A black coating or the like is applied to a junction portion between the glass member 12 and the heat transfer member 13 to convert the ray of light into the heat.

INDUSTRIAL APPLICABILITY

According to the steam engine of the present invention as described above in detail, a rotor comprising a jet pipe is provided in a sealed container filled with the liquid, the liquid is vaporized by a heating portion inserted in the central portion of the rotor, and a mixture of the liquid and steam is jetted from the jet pipe to rotate the rotor to thereby convert the heat added to the heating portion into the rotational energy. Therefore, the steam engine of the present invention can be used as a heat engine for taking out the power from various heat sources. Though the above embodiment has chiefly dealt with the case of converting the heat in a low-temperature state into the rotational energy, it needs not be pointed out that the steam engine of the present invention is capable of taking out the power by using a heat source of a high temperature based, for example, on the combustion or the like. As the liquid that serves as the operation fluid, further, a coolant such as Freon or the like can be used not being limited to water, as a matter of course.

The invention claimed is:

1. A steam engine, comprising a sealed container filling with a liquid, and a condenser arranged on an upper part of the sealed container communicated with the sealed container to condense steam of the liquid, wherein said sealed container contains a rotor that comprises:

a heating portion at a central portion thereof;

a folded jet pipe radially extending from the central portion and having a check valve for jetting at an end thereof; and a folded suction pipe radially extending from the central portion and having a check valve for suction at an end thereof, wherein said rotor is dipped in the liquid and is rotatably supported in the sealed container, and power of rotation of said rotor is taken out.

2. The steam engine according to claim 1, wherein a vacuum pump is connected to the said condenser, and pressure in said sealed container and in said condenser is set to be a saturated steam pressure of the liquid.

3. The steam engine according to claim 1, wherein the heating portion at the center of said rotor is heated by sunlight.

4. The steam engine according to claim 1, wherein said jet pipe and said suction pipe are formed in a streamline shape in cross section thereof.

5. The steam engine according to claim 2, wherein the heating portion at the center of said rotor is heated by sunlight.

6. The steam engine according to claim 2, wherein said jet pipe and said suction pipe are formed in a streamline shape in cross section thereof.

7. The steam engine according to claim 1, wherein said heating portion connects the folded suction pipe to the folded jet pipe in a radial direction of the rotor.

8. The steam engine according to claim 1, wherein the folded suction pipe extends in a same radial direction as that of the folded jet pipe.

9. The steam engine according to claim 1, wherein in a radial direction of the rotor, the folded suction pipe and the folded jet pipe extend in a same plane.

10. The steam engine according to claim 1, wherein a direction of a radial extension of the folded suction pipe coincides with that of the folded jet pipe.

11. The steam engine according to claim 1, further comprising:

a pipe through which a fluid of a high temperature flows to provide heat to the heating portion, said pipe being connected to the heating portion.

* * * * *